3,340,342
METHOD OF SUSPENDING A CORE MEANS IN A MOLD

Dennis P. Kane, Muskegon, and Fred E. Satchell, Grand Haven, Mich., assignors to Brunswick Corporation, a corporation of Delaware
Filed Sept. 16, 1963, Ser. No. 309,132
6 Claims. (Cl. 264—275)

This invention relates to plastic molding techniques and more particularly to a method and apparatus for molding plastic articles, such as bowling balls or the like and resulting articles.

At the present time, plastic articles, such as bowling balls having a core disposed within plastic cover stock material, are made by a process in which the core is suspended within the mold by a rigid rod. As a result, further work must be done on the article after molding to fill up the hole in the cover resulting from removal of the rigid rod.

An object of this invention is to provide a molding technique in which a core having a specific gravity different from that of the cover stock material is suspended during the molding operation by means which can remain permanently embedded in the cover.

Another object of the invention is to provide a method for molding an article, such as a plastic bowling ball or the like, with a core having a specific gravity different from that of moldable cover stock material comprising placing the core in a mold, suspending the core within the mold by a thin thread having a length to locate the core spaced from the walls of the mold, filling the mold with moldable cover stock material, holding the mold level to locate the core horizontally with the thread holding the core vertically and curing the cover stock material with the thread permanently embedded in the cover stock material.

Figure 1:
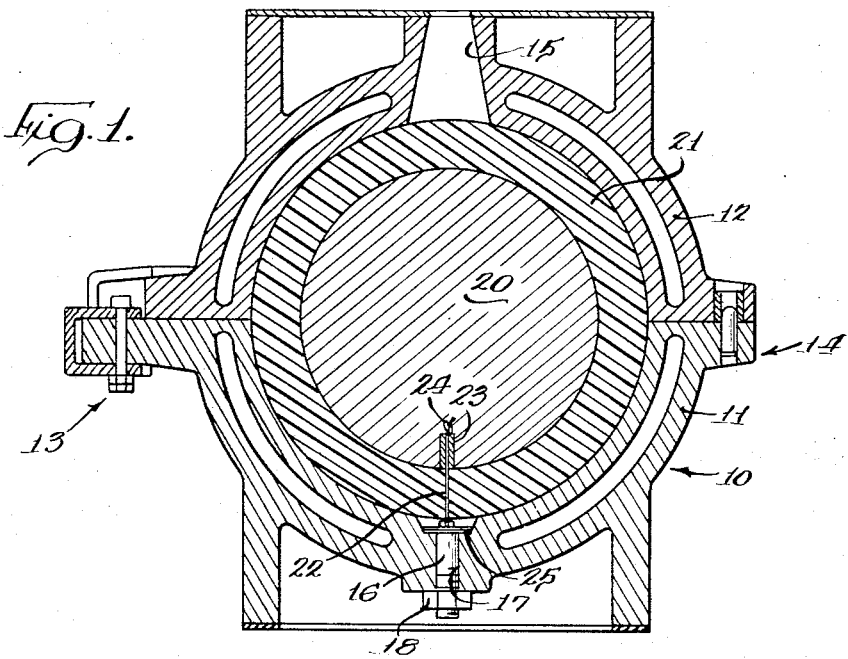
Figure 2:
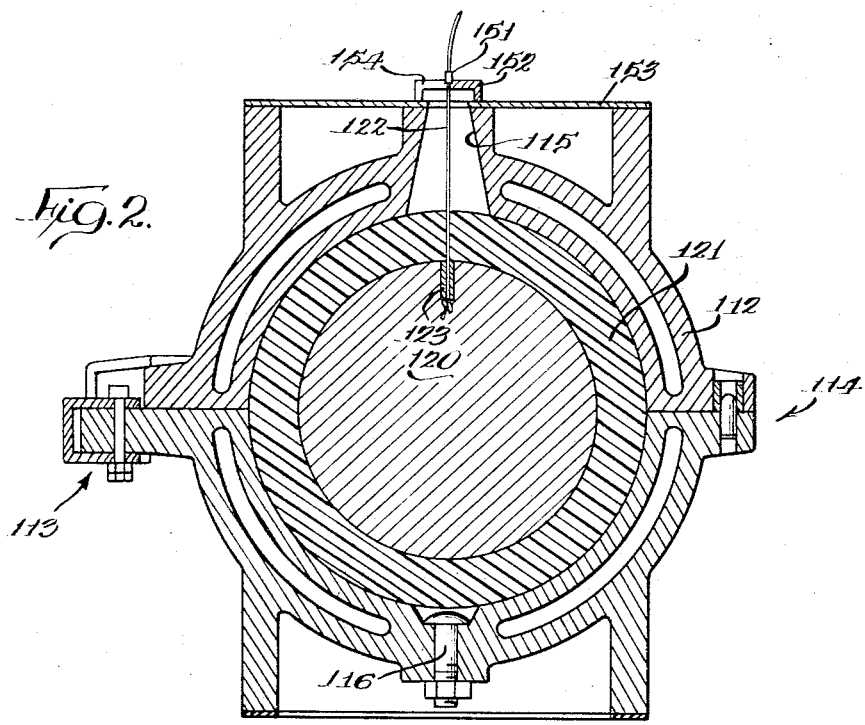

Further objects and advantages will become apparent from the following detailed description taken in connection with the accompanying drawings in which:

FIG. 1 is a vertical section through the center of a mold and showing a vertical section of a formed bowling ball therein wherein the core has a specific gravity less than that of the cover stock; and FIG. 2 is a view similar to FIG. 1 wherein the core has a specific gravity greater than that of the cover stock.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

For a more complete understanding of the articles that can be made by the method disclosed herein, and particularly the chemical composition of the various components, reference may be made to Satchell U.S. Patent No. 3,068,007, dated Dec. 11, 1962.

In making bowling balls, a core will normally have a specific gravity different from that of the cover material. In making lightweight plastic bowling balls, the specific gravity of the ball core is less than the plastic cover stock material and, thus, the core, if unrestrained, would float to the top of the cover stock material.

As shown in FIG. 1, the mold, indicated generally at 10, has a lower section 11 and an upper section 12, with the sections being held together by clamp mechanism, indicated generally at 13 and 14. The upper section 12 has a fill opening 15 through which the plastic cover stock material is directed into the interior of the mold. The lower mold section 11 has a core retainer pin 16 positioned within an opening 17 of the mold and which is held in position by a nut 18 threaded on the pin.

The formed bowling ball is shown within the mold and comprises a core 20 positioned centrally within the molded cover stock material 21. As shown in FIG. 1, with the core 20 having a specific gravity less than that of the cover stock material, the core is held centrally within the mold during the curing cycle by a thin thread 22, preferably of a monofilament material such as nylon, which extends through an opening in a wooden plug 23 and is knotted at 24. The opposite end of the thread is secured by a clamp 25 to the core retainer pin 16.

In carrying out the method disclosed in FIG. 1, with the mold open, the nylon thread 22 is attached to the core by threading it through a hole in the wood plug 23 and tying the knot 24 in the end. The wood plug is then pressed into a drilled hole in the core 20. The thread is then attached to the core retainer pin 16 at a location to provide a proper length of thread to hold the core in the desired position. The core retainer pin is then installed in the mold and held in position by the nut 18, the mold assembled and then filled with plastic material through the fill opening 15. The core is located horizontally by keeping the mold level and is located vertically by the predetermined length setting of the thread 22.

After curing, the mold can be opened and the ball removed with the nylon thread cut at the surface of the cover stock material. A part of the nylon thread then remains embedded in the cover stock material, but is not objectionable due to the minor amount thereof present in the ball.

FIG. 2 shows an embodiment of the method and apparatus for making a relatively heavyweight plastic ball in which the specific gravity of the ball core is greater than that of the cover stock material and, thus, the core must be suspended during the cure cycle to prevent its sinking to the bottom of the mold. In this embodiment, similar parts have been given the same reference numeral with a one added in front thereof to place the reference numerals in the one hundred series.

In this embodiment, the core is suspended from the top of the mold by having a thread 122, of nylon or other material, attached to the wood plug 123 secured in the core 120 with a metal retainer 151 attached to the thread at the desired location which engages a core support bracket 152 supported on a top plate 153 of the mold. This bracket 152 is slotted to define a pair of legs, one of which is indicated at 154, whereby the bracket can be laterally moved into position beneath the metal retainer 151.

In the method as illustrated in FIG. 2, the thread 122 is attached to the wood plug 123 with the wood plug pressed into a drilled hole in the core 120. The metal retainer 151 is clamped on the thread at the proper position. The core is placed in the mold and the mold closed, with the free end of the thread being held. After the mold is filled with cover stock material, the core is lifted up and the core support bracket 152 installed on the plate 153 with the metal retainer 151 in engagement with the bracket. Again, during the cure cycle the mold is held level to locate the core horizontally with the nylon thread 122 locating the core vertically.

With the method and apparatus disclosed herein, a ball is made which avoids treatment of the cover stock material after molding to fill a hole which normally occurs after removal of a core retainer pin. The thread is sufficiently small as to not adversely affcet the appearance or action of the ball.

We claim:
1. A method for molding articles with a core surrounded by molded material comprising, placing a core in a mold and attaching said core to the mold by thin flexible means at a position for holding the core against untethered vertical movement within the mold beyond the proper core position, filling the mold with said moldable material having a specific gravity sufficiently different from that of the core for causing relative vertical movement of the core if unheld within said material, said flexible means holding said core from movement beyond its proper position, and curing the moldable material with the core held within the moldable material by said flexible means and thereby permanently embedding the flexible means in said material.

2. The method of claim 1 wherein said core has a specific gravity greater than that of said moldable material and said attaching step comprises attaching said core to the upper part of the mold by a thin thread.

3. The method of claim 1 wherein said moldable material has a specific gravity greater than that of the core and said attaching step comprises attaching said core to the lower part of said mold by a thin thread.

4. The method of claim 1 wherein the placing and attaching steps comprise attaching said thin flexible means by securing an end thereof to a plug held in the core, thereafter placing the core in the mold, and securing the flexible means to the mold to hold the core spaced vertically from the interior of the mold.

5. The method of claim 1 wherein said thin flexible means extends vertically during said curing step.

6. A method for molding plastic bowling balls or the like in which a core having a specific gravity different from the cover stock material is positioned centrally within said cover stock material comprising, placing the core in a mold, attaching the core to the mold by a length by a length of thin thread with the thread having a proper length corresponding to the desired cover thickness to locate the core centrally in the mold, filling the mold with moldable cover stock material, holding the mold level to centrally locate the core in the mold with the thread tethering and holding the core and extended vertically, and curing the cover stock material with the thread extended and embedded in said cover stock material.

References Cited

UNITED STATES PATENTS

| | | | |
|---|---|---|---|
| 721,462 | 2/1903 | Richards | 264—275 |
| 1,473,954 | 11/1923 | Easton | 273—200 X |
| 2,081,059 | 5/1937 | Mitchell | 273—200 |
| 2,733,324 | 1/1956 | Sabouni | 264—271 |
| 3,208,750 | 9/1965 | Firth et al. | 264—278 X |

ROBERT F. WHITE, *Primary Examiner.*

R. B. MOFFITT, *Assistant Examiner.*